United States Patent Office 3,763,120
Patented Oct. 2, 1973

3,763,120
COPOLYMERS OF ALKYL STYRENES AND N-VINYL HETEROCYCLIC MONOMERS AND INVERSE SUSPENSION POLYMERIZATION USING THE SAME
Bobby Leroy Atkins, Lake Jackson, Tex., assignor to The Dow Chemical Company, Midland, Mich.
No Drawing. Original application Mar. 12, 1970, Ser. No. 19,128. Divided and this application Oct. 13, 1971, Ser. No. 189,025
Int. Cl. C08f 3/44, 3/90, 15/00
U.S. Cl. 260—80 M       7 Claims

ABSTRACT OF THE DISCLOSURE

This invention relates to a new interpolymeric composition of matter and particularly to copolymers of certain alkyl substituted alkenyl aromatic monomers and N-vinyl heterocyclic monomers. The new copolymers find utility as suspending agents for water-in-oil dispersions and as water dispersible coatings.

---

This is a division of Ser. No. 19,128 filed Mar. 12, 1970, now U.S. Pat. 3,651,035.

There are many applications utilizing a water dispersible coating. For example strippable protective coatings are commonly employed to protect articles having a fine finish during materials handling procedures. When the protective function is no longer needed, the coating should be easily removable by readily available solvents. Many of the prior strippable coatings, such as those of ethyl cellulose, are organo soluble or must be peelable. An aqueous system would be desirable.

Water soluble unsaturated monomers are conventionally polymerized by mass, solution or special oil-in-water suspension techniques. In U.S. 2,982,749, issued May 2, 1961, it is taught that aqueous solutions of such monomers and mixtures thereof can be suspended in an oil phase to form a suspension of globules ranging between 10 microns and 2 millimeters in diameter and polymerized therein to give polymeric products in bead form having a controlled size. The bead size was said to be controlled by the efficiency and amount of suspending agent used in the polymerization recipe. Those suspending agents indicated to be materials having a low hydrophilic-lyophilic balance naming a number of such materials at column 1, line 30 to column 2, line 13. The organic suspending agents taught in that patent are aromatic and chlorinated hydrocarbons.

The present invention achieves water dispersible coating with copolymers of from 20 to 80 percent by weight of an alkyl substituted styrene having a side chain of at least three carbon atoms and from 80 to 20 percent by weight of an N-vinyl heterocyclic monomer. The invention achieved also comprehends the polymerization of water-soluble unsaturated monomers in a water-in-oil dispersion by using certain of the indicated copolymers in an amount of suspending agent to be used ranging advantageously from about 0.01 weight percent to about 10 weight percent, water phase basis, depending in part on the monomers being polymerized, the identity of the organic phase, the size beads desired and upon other known factors. The optimum amount for any given system may be determined by simple preliminary experiment.

The useful alkyl substituted styrenes are exemplified by n-propyl styrene, isopropyl styrene, n-butyl styrene, t-butyl styrene, t-octyl styrene and others having at least one side chain of three or more carbon atoms attached to the phenyl nucleus in any position relative to the vinyl group. When the side chain contains less than three carbon atoms the hydrophilic/lyophilic balance is sufficiently upset that the resulting polymers are characterized by a different community of properties from those of this invention.

The N-vinyl heterocyclic monomers which may be employed in the present method include the various N-vinyl cyclic amides and N-vinyl cyclic carbamates of the respective formulae:

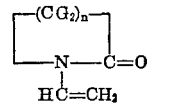
(vinyl lactams);

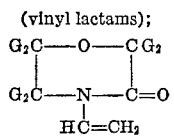
(N-vinyl-3-morpholinones); and

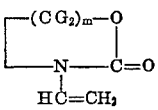
(N-vinyl-2-oxazolidinones and N-vinyl-2-oxazinidinones);

wherein each G is independently selected from the group consisting of hydrogen and alkyl radicals of from 1 to about 4 carbon atoms; $n$ is an integer from 3 to 5; and $m$ is an integer from 2 to 3.

The N-vinyl lactams and many of their derivative products, as have been disclosed in U.S. Pats. 2,265,450; 2,335,454; and in many other places, are very useful and widely employed materials. Likewise, many of the N-vinyl-2-oxazolidinones and related N-vinyl cyclic carbamates have great utility and provide for many benefits and advantages in numerous applications, particularly as regards their polymeric and resinous derivatives. Monomeric N-vinyl-2-oxazolidinones devoid of ring substitution other than hydrogen (and, of course, the characteristic carbonyl unit) have been disclosed in U.S. Pats. 2,786,043; 2,818,362; and 2,818,399.

Typical examples of useful N-vinyl heterocyclic monomers falling within the scope of the above formulae are:

N-vinyl-2-pyrrolidone;
N-vinyl caprolactam;
N-vinyl piperidone;
N-vinyl-5-methyl-2-pyrrolidone;
N-vinyl-3,3-dimethyl-2-pyrrolidone;
N-vinyl-3,3-dimethyl piperidone;
N-vinyl-2-oxazolidinone;
N-vinyl-5-methyl-2-oxazolidinone;
N-vinyl-5-ethyl-2-oxazolidinone;
N-vinyl-4,5-dimethyl oxazolidinone;
N-vinyl-2-oxazinidinone;
N-vinyl-6-methyl-2-oxazinidinone;
N-vinyl-3-morpholinone;
N-vinyl-5-methyl-3-morpholinone.

The copolymers are easily prepared by known polymerization procedures including suspension and emulsion techniques employing conventional polymerization conditions. Aqueous suspension is a preferred technique. Suspensions containing 50% or less of solids are preferred since they are more easily processed and employed as coatings.

The mixture of monomers in emulsion or suspension can be polymerized by the aid of heat and/or light in the presence or absence of polymerization catalyst at subatmospheric, atmospheric or superatmospheric pressure. The resultant copolymers of the invention can be isolated by known methods, such as precipitation, evaporation of solvent, or flaking on drying rolls. The polymeric dispersions prepared by means of emulsion or suspension polymerization techniques are preferably employed since such suspensions are useful directly in application of the copolymer.

The range of polymerization temperatures to be employed in accordance with the polymerization techniques practiced herein to insure the production of a satisfactory polymer product in each instance is governed by the pressure used which controls the boiling point of the aqueous suspending phase. A satisfactory lower temperature limit is determined by the polymerization initiation and polymerization propagation temperatures required by the monomers being polymerized.

An emulsifier is generally employed in aqueous emulsion polymerization practices preferably in an amount in the range of from about 0.01 to about 10.0 percent based on monomer weight and may be of the anionic, cationic or nonionic type. Because one is copolymerizing one monomer which is water soluble with another which is water insoluble the nature of the system causes self-stabilization as soon as polymerization begins. If however the water insoluble monomer (alkylsubstituted styrene) is present in amounts of greater than 50%, a small amount of an emulsifier is desirable. Appropriate emulsifying agents for present purposes include aryl sulfonates, alkali metal alkyl sulfates, alkyl naphthalene sulfonates, n-octadecyldisodium sulfosuccinate, di-t-butylphenoxy(polyethylene oxide)$_{40}$, sodium octylphenoxy (polyethylene oxide) sulfonate, isocetylphenyl polyethoxyethanol, nonylphenyl ether of nonaethylene glycol, sodium capryl phosphate, nonylphenyl ether of tetracontraethylene glycol, alkylphenyl polyethylene glycol ether, and particularly polyoxyethylene sorbitan monooleate, obtained as "Tween 81" as rosin ester of polyethylene glycol, obtained as "Synthetic AR–100 and dihexyl sodium sulfosuccinate, obtained as "Aerosol MA" and the like, etc. When greater than about 10 to 15 percent of the emulsifier is employed, there is usually no proportional increase in benefits and the resulting latex may have such a propensity to foam as to detract from its utility as a coating composition. The optimum amount of emulsifier and specific type can easily be determined by someone familiar with the field.

When the non-emulsified aqueous suspension polymerization is employed a conventional suspension stabilizer may be incorporated in the reaction mixture. This is particularly desirable in the preparation of those interpolymers containing greater than 50 percent of the alkenyl aromatic monomer and even then in small amount. Typical of these are the water soluble natural gums, such as gum arabic and gum tragacanth; the water soluble cellulose ethers, such as methyl cellulose and hydroxypropyl methyl cellulose; gelating polyvinyl alcohol etc. Since such materials are difficult to remove from the polymerized product, it is desirable to keep the amount used as small as may be necessary.

Conventional buffering agents may be added to the system if desired for a particular purpose, for example to avoid hydrolysis of certain vinyl heterocyclic monomers.

Suitable catalysts can be the peroxides, e.g. benzoyl peroxide, phthaloyl peroxide, naphthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-t-butyl peroxide, t-butyl hydroperoxide, Tetralin peroxide, 1-hydroxy-cyclohexyl hydroperoxide-1, urea peroxide, etc., certain sulfates, e.g. ferrous sulfate, etc., the percompounds, e.g. ammonium persulfate, sodium perchlorate, sodium perborate, potassium persulfate, etc., ozone, ozonides, etc., azo compounds, e.g. azobisisobutyronitrile, azodiisobutyramide, dimethyl or diethyl or dibutyl azodiisobutyrate, and the like. Azobisisobutyronitrile, t-butylhydroperoxide and ammonium persulfate are preferred catalysts. The catalysts may be used alone or in admixture with one another. Any suitable amount of the catalyst or catalyst mixture may be used, but in general, the catalyst concentration that gives satisfactory results may be within the range of 0.01 to 1 percent by weight of the entire polymerizable mass.

The copolymers of this invention form coatings from solution, latex, or other dispersion that are hard, somewhat brittle and are water dispersible. The coating compositions may include the usual coating additives such as dyes, pigments, heat and light stabilizers, biocidal materials and others.

The preparation of water dispersible coatings is illustrated by the following examples wherein all parts and percentages are by weight.

EXAMPLE 1

N-vinyl pyrrolidone (105 g.) and t-butyl styrene (45 g.) were mixed together in a beaker and to this was added 0.25 ml. of 1-amino-2-propanol to buffer the mixture. Then 1.5 g. of $\alpha',\alpha'$-azodiisobutyronitrile was dissolved in the mixture and the entire mixture was poured into a flask containing 600 ml. water. The mixture was stirred and purged with $N_2$ for 30 minutes and heated to a temperature of about 90° C. for one hour and then allowed to cool to room temperature over a 3-hour period. The resulting stable polymer suspension was filtered to remove large particles and stored for use.

In the same manner a copolymer was prepared from equal parts by weight of N-vinyl pyrrolidone and t-butyl styrene.

In the same manner a third composition was made from 70% by weight t-butyl styrene and 30% N-vinyl pyrrolidone.

Each of the above preparations can be used as a coating material which can be removed with water, i.e. redispersed. The coating formed is hard and brittle.

As indicated, the aqueous dispersions containing 50 weight percent or less of the interpolymers can be employed per se as coating compositions or the interpolymer can be isolated by known techniques and obtained as a dry resin.

Certain of the copolymers of this invention can also be employed with advantage in an inverse suspension polymerization process such as that disclosed in U.S. 2,982,749. The useful copolymers are those of an alkyl substituted alkenyl aromatic monomer and an N-vinyl pyrrolidone as earlier defined.

Many water soluble unsaturated monomers can be polymerized by that process using the copolymers of this invention. Such monomers include acrylamide, methacrylamide, acrylic acid and salts thereof, methacrylic acid and salts thereof, vinyl trimethyl ammonium chloride and others well known to the art. The monomers may be polymerized alone to form homopolymers or in combination with each other to form interpolymers.

Aqueous solutions of the monomers to be polymerized can be varied widely in monomer concentration, from about 5 to about 80 weight percent of monomer in water depending upon the monomer and the polymerization temperature. The ratio of aqueous monomer phase to oil phase is also widely variable, advantageously from about 5 to 50 parts by weight of aqueous phase to 95 to 50 parts by weight of oil phase.

The oil phase may be any inert hydrophobic liquid which can be separated readily from and which does not dissolve the polymeric product. Preferred among such materials are those aliphatic hydrocarbons that are liquids under the conditions of temperature and pressure employed in the polymerization. Representative of the preferred species are the aliphatic hydrocarbons containing from about 6 to 20 carbon atoms and mixtures thereof. Thus n-heptane is a suitable oil phase material as is a mixture of $C_{16}$ to $C_{20}$ alpha olefins, an isoparaffinic solvent having a boiling point of about 400° C. and sold as Stoddard Solvent M, and a $C_{12}$ to $C_{14}$ kerosene cut sold as Soltrol 130. Other useful aliphatic hydrocarbons will be known to those skilled in the art. The suspending agent of this invention will also function with aromatic hydrocarbons as the solvent.

The reaction parameters are not unconventional for an addition polymerization. The reaction time may be varied between broad limits depending upon the monomer moiety being polymerized, the activity and concentration of catalyst, the degree of conversion desired, and the temperature of polymerization. Typically the reaction will be substantially complete in from 10 minutes to 24 hours.

The temperatures may also be chosen between wide limits of from about 20° C. to 100° C. with the optimum temperature for any given system being determined by simple preliminary experiment.

The polymerization is usually carried out at atmospheric pressure. However, superatmospheric pressure is advantageously used when volatile ingredients are involved.

Polymerization initiators including peroxide catalysts such as t-butyl hydroperoxide or dimethane sulfonyl peroxide and redox systems such as t-butyl hydroperoxide or potassium persulfate in combination with usual reductants can be used in the practice of this invention (U.S. 2,982,749, column 2, line 51 to column 3, line 2).

The polymers produced in accordance with this invention are excellent suspending agents for polymerizing water soluble unsaturated monomers in aliphatic hydrocarbons to produce particulate polymers. In this regard closely related agents such as copolymers of vinyl acetate and vinyl pyrrolidone, polyvinyl pyrrolidone, copolymers of acrylamide and vinyl pyrrolidone, styrene butadiene latexes and others failed to acceptably stabilize the dispersion during polymerization.

The following examples are intended to illustrate the use of the copolymers as water-in-oil suspending agents. All parts and percentages are by weight.

EXAMPLE 2

A solution of 71.6 milliliters of a 41.9 percent solution of acrylic acid was diluted with 128.4 milliliters of water to give a 15 percent aqueous solution of acrylic acid. This solution (200 milliliters) was added to 400 milliliters of n-heptane (AR). To this mixture was added 5 milliliters of an aqueous dispersion (20 percent) of a copolymer of 70 percent vinyl pyrrolidone, 30 percent t-butylstyrene. The mixture was agitated to form a bead suspension of the monomer solution in the hydrocarbon. Polymerization was carried out in a resin kettle with a paddle type stirrer operated at low speed (ca. 250 r.p.m.) after purging with nitrogen gas for 90 minutes and then adding first 6 milliliters of 0.1 percent aqueous solution of $K_2S_2O_8$ (200 p.p.m.—based on monomer) followed by 3.6 milliliters of 0.1 percent aqueous solution of $Na_2S_2O_5$ (120 p.p.m.—based on monomer). Stirring was continued for 48 hours at room temperature. The polymer beads were then separated from the suspending medium and dried.

Similarly the same monomer was polymerized using Stoddard Solvent M (an isoparaffinic solvent, B.P. ca. 400°), Soltrol 130 ($C_{12}$—$C_{14}$ kerosene cut) and in $C_{16}$—$C_{20}$ α-olefin with the same polymer resulting.

EXAMPLE 3

For purposes of contrast the following agents (invert emulsifiers known to the art) were tried in the process of Example 2; Alkaturg C; a substituted oxozoline sold as Emcol 511 and 511A, and modified alkanolamides. In each instance when the monomer was polymerized the beads agglomerated to produce a thickened mass of material which included water, polymer and hydrocarbon.

EXAMPLE 4

For further contrast various commercially available copolymers of vinyl pyrrolidone were tried as suspending agents. For example copolymers of vinyl pyrrolidone/vinyl acetate of 30/70, 50/50 and 70/30 weight percent of monomers were used in the form of 50 weight percent solutions in isopropyl alcohol; and a 60/40 copolymer was used as a dispersion in the aqueous phase of an acrylic acid suspension polymerization in $C_{16}$—$C_{20}$ α-olefin. None of these preparations produced the desired result of obtaining the high molecular weight polymer in bead form. A homopolymer of vinyl pyrrolidone (sold as PVP K–90), was also tried with similar results.

A copolymer of vinyl pyrrolidone and acrylamide (40/60 weight percent ratio), was also tried with the same negative result. Other products tried were styrene-butadiene copolymer latex styrene homopolymer; and a styrene-butadiene-acrylic latex. All of these also failed to produce a bead polymer.

What is claimed is:

1. In a water-in-oil suspension polymerization method for making polymers and copolymers of water-soluble ethylenically unsaturated monomers by forming a water-in-oil suspension of an aqueous solution containing between 5 and 80 weight percent of at least one water-soluble ethylenically unsaturated monomer in an inert hydrophobic liquid organic dispersion medium containing a suspending agent the ratio of aqueous monomer phase to said dispersion medium ranging between 5 and 50 weight parts of said aqueous phase to 95 to 50 parts of said dispersion medium, and polymerizing the suspended monomer in the presence of a catalytic amount of a polymerization initiator to obtain a disperse phase polymeric product in bead form, the improvement wherein said suspending agent is a copolymer of an alkyl substituted styrene and an N-vinyl pyrrolidone and wherein said alkyl substituent contains at least three carbon atoms.

2. The process of claim 1 wherein said copolymer suspending agent is of tertiary butyl styrene and N-vinyl pyrrolidone.

3. The copolymer suspending agent of claim 2 composed of from 30 to 70 weight percent tertiary-butyl styrene and 70 to 30 weight percent of N-vinyl pyrrolidone.

4. The method of claim 1 wherein said water soluble ethylenically unsaturated monomer is acrylic acid.

5. The method of claim 1 wherein said water soluble ethylenically unsaturated monomer is acrylamide.

6. The method of claim 1 wherein said organic dispersion medium is an aliphatic hydrocarbon.

7. The method of claim 6 wherein said aliphatic hydrocarbon is n-heptane, a mixture of alpha-olefins having from 16 to 20 carbon atoms, a kerosene cut having from 12 to 14 carbon atoms, or an isoparaffinic solvent having a boiling point of about 400° C.

References Cited

UNITED STATES PATENTS

| | | | |
|---|---|---|---|
| 2,982,749 | 5/1961 | Friedrich | 260—23 |
| 3,417,054 | 12/1968 | Merijan | 260—66 |

JOSEPH L. SCHAFER, Primary Examiner

C. A. HENDERSON, Jr., Assistant Examiner

U.S. Cl. X.R.

260—29.6 HN, 80.3 N, 88.1 PA, 88.1 P, 89.7 R